United States Patent [15] 3,701,973 von der Pfordten [45] Oct. 31, 1972

[54] DATA PROCESSING ARRANGEMENT FOR PROCESSING WAITING TIME COMMANDS

[72] Inventor: Dietrich von der Pfordten, Egenbuttel, Germany

[73] Assignee: U.S. Philips Corporation, New York, N.Y.

[22] Filed: Sept. 23, 1970

[21] Appl. No.: 74,570

[30] Foreign Application Priority Data

Sept. 24, 1969 Germany..........P 19 48 302.4

[52] U.S. Cl...............................................340/172.5
[51] Int. Cl...............................................G06f 9/18
[58] Field of Search..............................340/172.5

[56] References Cited

UNITED STATES PATENTS

| | | | |
|---|---|---|---|
| 3,582,896 | 6/1971 | Silber | 340/172.5 |
| 3,333,252 | 7/1967 | Shimabukuro | 340/172.5 |
| 3,312,951 | 4/1967 | Hertz | 340/172.5 |
| 3,363,234 | 1/1968 | Erickson et al. | 340/172.5 |
| 3,449,722 | 6/1969 | Tucker | 340/172.5 |

*Primary Examiner*—Gareth D. Shaw
*Assistant Examiner*—Sydney R. Chirlin
*Attorney*—Frank R. Trifari

[57] ABSTRACT

A data processing arrangement for processing waiting time commands comprising a source of clock signals representing real time and waiting time, a memory for recording the real times of termination of waiting time commands, means for providing only one waiting time clock is set at the difference time between the instantaneous real time and the real time of the next termination of the waiting time of a waiting time command whenever a waiting time terminates and also when a new waiting time command occurs.

4 Claims, 3 Drawing Figures

*INVENTOR.*
DIETRICH VON DER PFORDTEN
*BY*
[signature]
AGENT

INVENTOR.

BY DIETRICH VON DER PFORDTEN

AGENT

DATA PROCESSING ARRANGEMENT FOR PROCESSING WAITING TIME COMMANDS

The invention relates to a data processing arrangement for processing waiting time commands by means of clocks for real time and waiting time and to a memory for recording the real times of the termination of waiting time commands.

One or more clocks are used for processing time commands in data processing arrangements. These clocks are either functional units which can be interrogated by a program and are used for indicating real time (real time clocks) or functional units which can be adjusted by the program to predetermined waiting times (waiting time clocks). After being to a particular waiting time and switched on, waiting time clocks return to their zero position synchronously with the real time. Once the zero position has been reached the waiting time clock applies a signal to the data processing arrangement which thereupon handles the time-dependent task. The data processing arrangement must frequently handle several time-dependent tasks simultaneously (or seemingly simultaneously). To this end the data processing arrangements are either provided with one real time clock or several waiting time clocks or with one real time clock and several waiting time clocks.

When processing time commands with the aid of a real time clock, the memory of the data processing arrangement keeps with a waiting time list. If a waiting time command occurs during a processing program the real time at which the processing program must be called in again is determined first. This time accompanied with the jump address of the processing program is introduced on the waiting time list. Occasionally all processing programs whose waiting times have terminated are searched from the waiting time list. To this end the times on the waiting time list are compared with the real time which can be read on the real time clock. Drawbacks of this method are the possibility of slight inaccuracies in keeping up the waiting time and the time-consuming regular search of the waiting time list. The accuracy of keeping up the time does not depend on the accuracy of the clock used, but on the instant after termination of the waiting time when the waiting time command is handled. Due to the waiting time list being searched regularly at fixed time intervals a waiting time command which terminates shortly after a searching operation is only carried out at the next searching operation. Thus, the accuracy of the waiting time in this case depends on, how often the waiting list is searched. When the list is searched too often a considerable program time is wasted particularly when only few long duration waiting time commands are involved, whereas an infrequently performed searching operation results in a great inaccuracy of the instant when the command is carried out. The great advantage of this method, however, is the low cost in apparatus.

When processing time commands with the aid of waiting time clocks the memory of the data processing arrangement keeps up a clock list. This list provides one position for each waiting time clock. When a waiting time occurs in a precessing program, a non-occupied waiting time clock is first selected and is set to the desired waiting time and start to count down. The connecting address of the clock is introduced into the corresponding list position. As soon as a waiting time clock has reached the zero position, a signal is applied to the program command register. This signal causes the program command register to interrupt the running processing program and to select from the clock list the jump address of the processing program associated with the terminated waiting time clock. This processing program is subsequently continued. A drawback of this method is the high cost in apparatus because as many waiting time clocks must be provided as the maximum possible number of simultaneously occurring waiting time commands. An advantage is the accurate maintenance of time because the command is carried out exactly when the relevant difference time clock has terminated. In addition, when being compared with the previous method, the time-consuming regular search of a list is not necessary.

Alternatively, both methods of processing waiting time commands are frequently used in common. Waiting time clocks are used for short waiting times, which are to be maintained accurately, whereas for comparatively long waiting times the accuracy of the method is satisfactory when using the real time clock. The cost in apparatus may then be maintained lower than when exclusively using waiting time clocks. However, a drawback again is the time-consuming regular search of the waiting time list.

The present invention avoids the said drawbacks and is characterized in that only one waiting time clock is provided which can be set at the waiting time between the instantaneous absolute time and the absolute time of the next termination of the waiting time of a waiting time command whenever a waiting time command terminates and when a new waiting time command occurs.

In this manner the waiting time list is only searched when a waiting time command has terminated or when a new waiting time command occurs so that no program time is unnecessarily consumed although only one waiting time clock is required in addition to the real time clock. Thus a minimum cost in apparatus is achieved with a minimum program time. The number of waiting time commands which may be simultaneously present is then substantially arbitrary and is only limited by the memory for recording absolute times of the termination of waiting times. In addition, the full accuracy of the two clocks is utilized for carrying out a waiting time command.

In order that the invention may be readily carried into effect a few embodiments thereof will now be described in detail by way of example with reference to the accompanying diagrammatic drawings, in which FIG. 1 shows the cooperation of the two clocks with the memory and the program command register.

Figure 1:
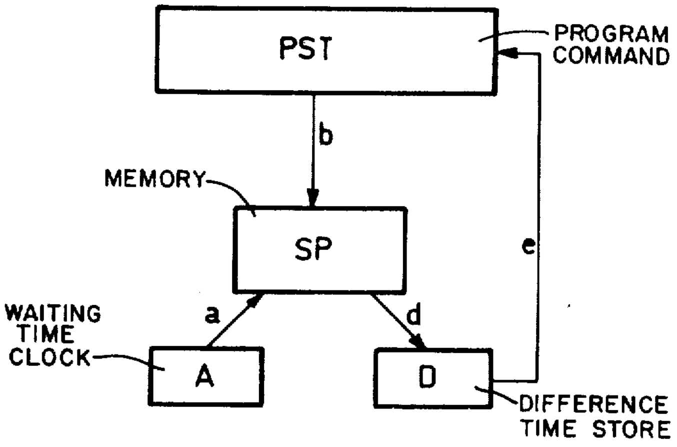

The program command register PST of FIG. 1 applies a waiting time command, indicating the waiting time duration as well as the jump address and further necessary data through line *b* to the memory SP. In this memory the real time of termination of this waiting time command is determined by adding the waiting time duration to the real time, provided by the real time clock through the line $a$ and the so resulted absolute time is stored in the memory SP together with the other contents of the command. Subsequently the next available termination time is found from all real times of termination of the available waiting time commands in the memory SP. This is effected, for example, in such a manner that the waiting time command at position 1 of the memory SP is compared with the command at position 2 and that the first to occur instant of termination is momentarily stored, and subsequently this momentarily stored value is compared with the waiting time command at position 3 of memory SP, etc., until all waiting time commands have been compared. Then the momentarily stored value directly indicates the next termination of the waiting time of a waiting time command. From this value and the real time of the real time clock A, the difference time up till the termination of the waiting time thus found is determined and the waiting time clock D is set and switched on at this difference time through the line $d$. When a new waiting time command occurs, only the instant of termination of the new waiting time command need be compared with the momentarily stored value of the next occurring instant of termination. If the new instant of termination is earlier than the previous one, the difference time clock D is set at the corresponding difference time and the new instant of termination is momentarily stored; otherwise the new waiting time command is only stored in the memory SP.

Figure 2:
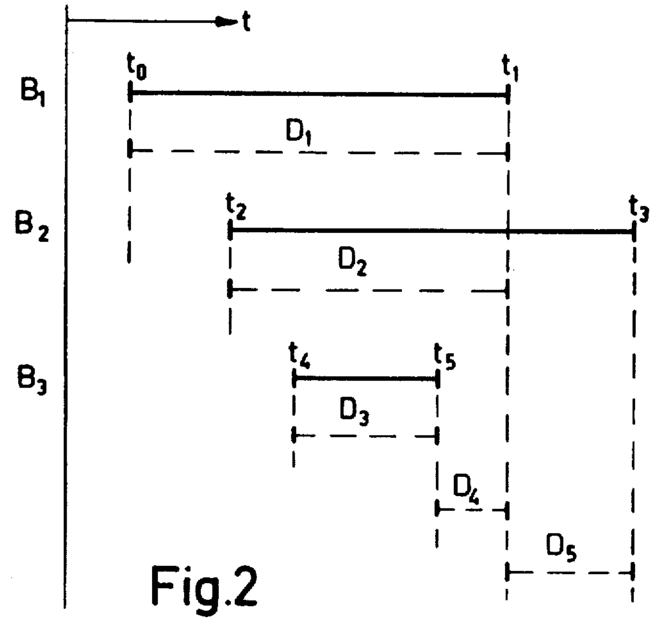
FIG. 2 shows an embodiment for the chronological arrangement of several chronologically overlapping waiting time commands.

The above-described process is repeated when a new waiting time command occurs prior to termination, i.e., reaching zero, of the waiting time clock. This case is shown in FIG. 2, where the waiting time command B1 occurs at the absolute instant $t_0$ and whose waiting time is to be terminated at the absolute instant $t_1$. If this is the first and only waiting time command, of course the absolute instant $t_1$ is found by checking at which time the next termination will occur and so the time $D1 = t_1 - t_0$ is determined therefrom as the difference time and the waiting time clock D is set at this value as is shown in FIG. 2.

At the instant $t_2$, which may be before the instant $t_1$, the second waiting time command $B_2$ occurs whose waiting time is to be terminated at the absolute instant $t_3$. Thus, the termination instant $t_1$ is still found by checking at which time the next termination instant will occur, that is to say, the same instant as that found in the first checking procedure. The difference time clock D thus need not be varied. It may, however, be essential for simplification of control to leave the result of the first checking procedure out of consideration. Then the new difference time $D_2 = t_1 - t_2$ would result and the difference time clock D would be set at this value. Since the waiting time clock D at the instant $t_2$ includes the residual difference time $D_2$ anyway, the adjustment of the difference time is actually not varied. A third waiting time command may occur at the instant $t_4$ whose waiting time is to be terminated at the absolute instant $t_5$ which instant is to be before the instant $t_1$. The checking procedure then following at the next instant of termination in one of the manners described above would then, however, determine absolute instant $t_5$ as being the next instant of termination. The difference time clock D is now set at the difference time $D3 = t_5 - t_4$, that is to say, at the instant $t_4$.

If no further waiting time commands occur, the difference time clock terminates at the absolute instant $t_5$ and signals through the line $e$ to the program command register PST that one waiting time has terminated. The program command register PST thereupon derives the further data from the memory SP, such as the jump address of the associated waiting time command B3, and simultaneously or immediately thereafter the next instant of termination is searched from the waiting time commands B1 and B2 which are still in the memory SP. To this end all non-processed waiting time command must be compared for this case of termination of the waiting time clock D.

In the embodiment described the instant $t_1$ is thus determined as the next instant of termination. The waiting time clock D is then set at the difference time $D4 = t_1 - t_5$ and is switched on again. If no new waiting time command occurs, the waiting time clock terminates at the absolute instant $t_1$ and again applies a signal through line $e$ to the program command register PST. The further operating sequence proceeds as described above, but now the absolute instant $t_3$ is determined as being the next instant of termination. The waiting time clock D is then set at the difference time $d5 = t_3 - t_1$. When the waiting time clock has terminated again, the last waiting time command $B_2$ is also dealt with.

Figure 3:
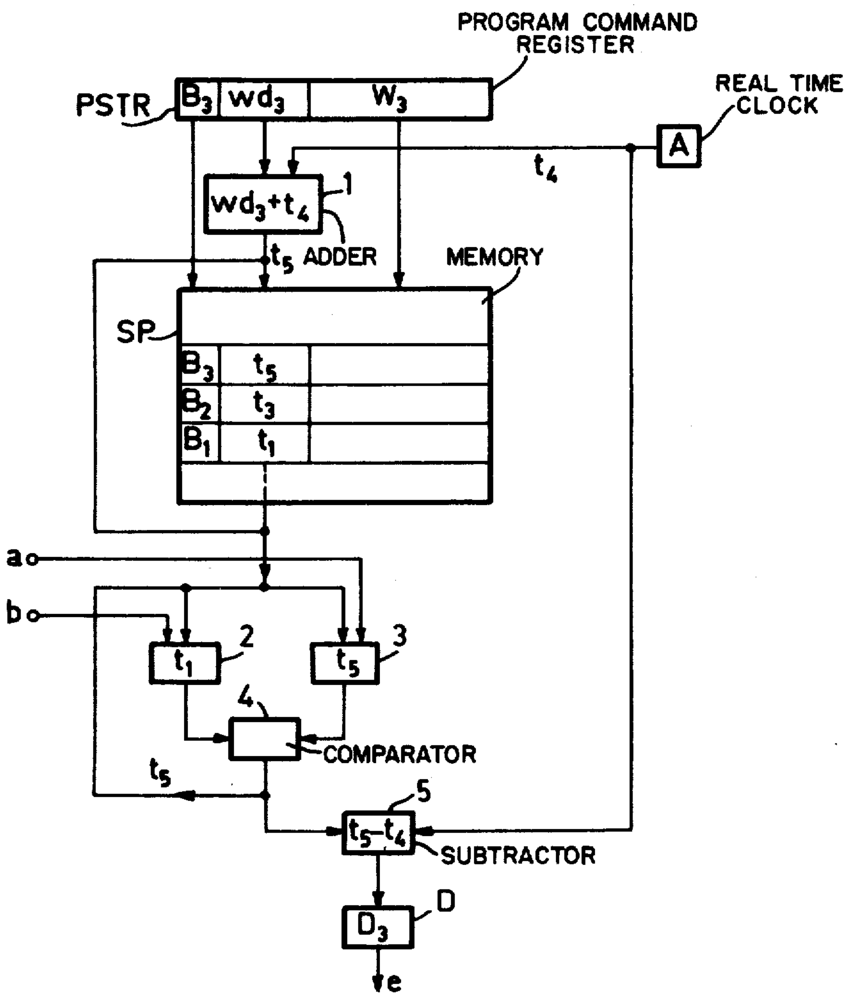
FIG. 3 shows an embodiment for a possible system arrangement.

FIG. 3 shows an embodiment of a possible system arrangement according to the invention. The embodiment shows the situation which occurs when the third waiting time command $B_3$ arrives at the instant $t_4$, the waiting time commands $B_1$ and $B_2$ having come in at earlier instants. PSTR is the program command register in which the waiting time command $B_3$ having a waiting time duration $Wd_3$ and other data $W_3$ appear. There is an adder 1, which may be present in the computer itself for performing occurring adding - subtracting instructions, etc. As in FIG. 1, the memory is denoted by SP, the real time clock by A and the waiting time clock by D. Furthermore, there are auxiliary registers 2 and 3, a comparator 4 and a subtractor 5 which latter may alternatively be the arrangement 1 as is common practice in computers and to which the control of the assembly is then adapted. In this case the data for the waiting time commands B1 and B2 are already stored in the memory. It has already been determined that the instant $t_1$ occurs earlier than $t_3$ in the following manner. At each instant when a waiting time command is stored in the memory SP, the latter is searched. At a command via a line $a$ the instant $t_2$ was registered in auxiliary register 3. At a command via line $b$ the instant $t_3$ was registered in auxiliary register 2. The instants $t_2$ and $t_3$ were compared in the comparator 4 and the first occurring instant, namely $t_1$, was determined. This first instant $t_1$ was registered in auxiliary register 2 and retained for further comparison when a new waiting time command arrives. When such a new waiting time command, in this case $B_3$, arrives $B_3$ with Wd 3 and $W_3$ is present in register PSTR. The part $d3$, the waiting time duration, is added in arrangement 1 to the real time $t_4$ at that instant which is provided by the clock A. The sum $t_5 = t_4 + d_3$ is the instant when the waiting time command must terminate. This instant $t_5$ and the data $B_3$ and $W_3$ are now stored in the memory SP. In addition this instant $t_5$ is registered by a new command via line $a$ in the auxiliary register 3. Then the comparison between $t_1$ and $t_5$ is effected in comparator 4. The instant $t_5$ terminates earlier so it appears at the output of comparator 4. The instant $t_5$ is registered in auxiliary register 2 (for later comparison with new waiting time commands) and is also applied to subtractor 5. Subtractor 5 also receives the real time $t_4$ from clock A and the difference $D_3 = t_5 - t_4$ is determined therein. Thus $D_3$ indicates the difference time between the real time and the instant when the waiting time command $B_3$ must have terminated. This value $D_3$ is stored in the waiting time clock D. The output $e$ of clock D is again connected to the program command register (see FIG. 1).

The range of the waiting time clock, that is to say the longest adjustable waiting time, must at least be equal to the longest occurring waiting time of a waiting time command. Since a large range of the waiting time clock also involves high cost, it will now be shown how the range may be limited. When a difference time to be set exceeds the range of the waiting time clock, the latter is set at its maximum time. In this case, however, no signal is applied to the program command register when the waiting time clock terminates, but the waiting time clock is again set; but this time at the remaining difference time which is the original difference time reduced by the maximum time of the waiting time clock. For this resetting of the waiting time clock it is then, however, not necessary to search the waiting times, only being necessary to determine the new difference time from the unchanged absolute instant of termination of the waiting time and this absolute time must be determined from the real time clock.

This process may be repeated several times in succession when the new reduced difference time is still longer than the maximum time of the waiting time clock, i.e., when the original difference time exceeds the range of the waiting time clock by a multiple of the range. The waiting time clock is then repeated by reset at the maximum time until the reduced difference time is smaller than the range of the waiting time clock. The range of the waiting time clock thus need only be a fraction of the longest occuring difference time, which reduces the cost considerably.

What is claimed is:

1. A data processing arrangement for processing waiting times, comprising a memory, a clock source applying a real time signal to said memory, a program command register for applying a waiting time command to said memory, said memory determining the real time of termination of said waiting time command by adding the duration of said waiting time command to said real time signal from said clock source, a second clock source, said second clock source responsive to said memory for storing the difference between real time and each successive next occurring instant of waiting time command terminations, said second clock providing a signal to said program command register at the end of one waiting time.

2. The combination of claim 1, wherein said second clock source responds to a difference time exceeding the maximum time range of said second clock by reaching a setting equal to said difference time reduced by said maximum time.

3. The combination of claim 1, wherein said second clock responds to a difference time exceeding the maximum time range of said second clock by a multiple thereof by reaching a setting equal to a reduced difference time corresponding to said multiple.

4. A system for processing waiting time commands comprising a program command register including a waiting time command, a waiting time duration, and information, an adder, a memory, a real time clock, a waiting time clock, a first auxiliary register, a comparator and a subtractor, a first command line coupled to the second auxiliary register for transferring the time of the second command from said memory to said second auxiliary register, a second command line coupled to the first auxiliary register for transferring the time of the third command from said memory to said first auxiliary register, said comparator coupled to said first and second registers for determining the time of the first command, means coupling the output of said comparator to said first auxiliary register for storing said time of said first command in said first register, means applying the next successive waiting time duration from said program command register to said adder, means coupling said real time clock to said adder, said adder adding a real time clock signal to said next successive waiting time duration to provide an output representative of the instant of termination of said next successive waiting time command, means coupling said adder output to said memory, means coupling said next successive waiting time data to said memory for storage with said adder output at a corresponding memory location, means coupling said adder output to said second auxiliary register for comparison with the contents of said first auxiliary register, means applying said comparator output to said subtractor, means applying a real time signal from said real time clock to said subtractor, and means applying the output of said subtractor to said waiting time clock for storing therein the difference time between said real time and the instant of termination of the waiting time command of said next successive waiting time.

* * * * *